United States Patent
Arimilli et al.

(10) Patent No.: US 6,202,131 B1
(45) Date of Patent: *Mar. 13, 2001

(54) METHOD AND APPARATUS FOR EXECUTING VARIABLE DELAY SYSTEM BUS OPERATIONS OF DIFFERING TYPE OR CHARACTER WITHOUT DEAD LOCK USING SHARED BUFFERS

(75) Inventors: Ravi Kumar Arimilli, Austin; John Michael Kaiser, deceased, late of Cedar Park, by Eileen T. Kaiser, administratrix; Derek Edward Williams, Austin, all of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/004,147

(22) Filed: Jan. 7, 1998

(51) Int. Cl.[7] .................................................... G06F 13/00
(52) U.S. Cl. ........................................... 711/141; 711/146
(58) Field of Search ................................... 711/141, 146, 711/119, 120, 121, 167, 124; 709/248, 400

(56) References Cited

U.S. PATENT DOCUMENTS 5,881,303 * 3/1999 Hagersten et al. ..................... 712/30
5,958,011 * 9/1999 Arimilli et al. ..................... 709/224

* cited by examiner

Primary Examiner—Glenn Gossage
(74) Attorney, Agent, or Firm—Mark E. McBurney; Richard A. Henkler (57) ABSTRACT

A method and apparatus for preventing the occurrence of deadlocks from the execution of variable delay system bus operations. In general, each snooper excepts a given operation at the same time according to an agreed upon condition. In other words, the snooper in a given cache can accept an operation and begin working on it even while retrying the operation. Furthermore, none of the active snoopers release an operation until all the active snoopers are done with the operation. Execution of a given operation is started by the snoopers at the same time and finished by each of the snoopers at the same time. This prevents the ping-pong deadlock by keeping any one cache from finishing the operation before any of the others. The snoopers initiate operations at the same time based upon a common predefined event and ensure the operations end are finished concurrently when no outstanding retry operations are detected.

8 Claims, 5 Drawing Sheets

METHOD AND APPARATUS FOR EXECUTING VARIABLE DELAY SYSTEM BUS OPERATIONS OF DIFFERING TYPE OR CHARACTER WITHOUT DEAD LOCK USING SHARED BUFFERS

CROSS-REFERENCE TO RELATED APPLICATIONS

The present patent application is related to Ser. No. 09/004,144, entitled "METHOD AND APPARATUS FOR EXECUTING MULTIPLY-INITIATED MULTIPLY-SOURCED VARIABLE DELAY SYSTEM BUS OPERATIONS" which is hereby incorporated by reference herein.

The present patent application is related to Ser. No. 09/004,137, entitled "METHOD AND APPARATUS FOR EXECUTING MULTIPLY-INITIATED, SINGLY-SOURCED VARIABLE DELAY SYSTEM BUS OPERATIONS", now abandoned, which is hereby incorporated by reference herein.

The present patent application is related to Ser. No. 09/004,146, entitled "METHOD AND APPARATUS FOR EXECUTING SINGLY-INITIATED, MULTIPLY-SOURCED VARIABLE DELAY SYSTEM BUS OPERATIONS", now abandoned, which is hereby incorporated by reference herein.

The present patent application is related to Ser. No. 09/004,148, entitled "METHOD AND APPARATUS FOR EXECUTING MULTIPLY-INITIATED, MULTIPLY-SOURCED VARIABLE DELAY SYSTEM BUS OPERATIONS", now U.S. Pat. No. 6,128,705, which is hereby incorporated by reference herein.

The present patent application is related to Ser. No. 09/004,149, entitled "METHOD AND APPARATUS FOR EXECUTING SINGLY-INITIATED, SINGLY-SOURCED VARIABLE DELAY SYSTEM BUS OPERATIONS", now abandoned, which is hereby incorporated by reference herein.

BACKGROUND

1. Field of the Present Invention

The present invention generally relates to data processing systems, and more specifically, to methods and apparatuses residing in such systems that use shared buffers and prevent the occurrence of deadlock from the execution, of variable delay system bus operations.

2. History of Related Art

The evolution of the computer industry has been driven by the insatiable appetite of the consumer for ever increased speed and functionality. One species which has evolved from the above is the multi-processor computer.

Multi-processor systems, in similarity to other types of computer systems, have many different areas that are ripe for improvements. One such area is the processing of variable delay system bus operations.

Modern multi-processor systems typically include a number of processing elements, and a main memory, each of which are connected by a series of buses that ultimately terminate in a common system bus. The processing elements usually include a processor having a pre-determined amount of on-board cache and, in some cases, a cache hierarchy. The cache hierarchy, typically, includes a number of caches (e.g. level 0–2) which are interposed between the processor and the common system bus.

In general, operations, in such multi-processor systems, are performed by the processor, residing at the top of the cache hierarchy, placing an operation on the bus between the processor and the first off-board cache. The first off-board cache then propagates the operation, if necessary, to the next lower level cache, if it exists, which then repeats the propagation down the cache hierarchy, if necessary, until the operation finally arrives at the system bus.

Once the operation has arrived at the system bus, it is then snooped by all the caches monitoring the system bus. After a snooping cache detects an operation, it must determine whether or not the execution of the snooped operation can proceed. A cache may be unable or refuse to accept (execute) a snooped operation for any number of reasons. For example, the resources necessary to execute an operation, such as the cache directory or state machines to process the snooped operation may be busy with other work and unable to process the snooped operation. In general, most system bus protocols allow any operation to be refused when a bus participant is unable to process the operation.

If the snooping cache cannot process the operation, then it will send a "RETRY" signal on the system bus. The RETRY signal informs the initiator of the operation that execution thereof was unsuccessful, and that the operation should be re-tried, if still necessary, at a later point in time.

The amount of time that a participant has in order to make a decision concerning the acceptance of a snooped operation, and to send a snoop response (e.g. "RETRY") is usually fixed for any given system via the bus protocol. Unfortunately, there are certain operations, due to their very nature, for which it is essentially impossible to determine the snoop response in the fixed period set by most bus protocols.

In example, the PowerPC™ (PowerPC is a trademark of International Business Machines Corporation) architecture uses a TLBSYNC operation which requires that all TLBIE operations previously issued by the processor issuing the TLBSYNC have completed on all other processors in the system. As a direct result of the above requirement, all other processors in the system must be polled in order to determine if the previously issued TLBE operations have completed. In this case, the TLBSYNC operation must be propagated from the system bus to the top of each of the cache hierarchies to interrogate the other processors in the system. Those skilled in the art will readily recognize that a variable amount of time is required in order to propagate the TLBSYNC operation from the system bus to the processors at the top of each of the cache hierarchies, thus making it extremely difficult, if not impossible, to determine the "correct" snoop response (e.g. "RETRY/No RETRY") within the fixed time period set by most bus protocols.

It is just these types of operations which increase the likelihood of a deadlock occurring within the system. For example, assume that an operation is placed on the system bus by one participant (i.e. an initiator) and snooped by two other participants (recipients). During the first initiation of the operation, both recipients snoop the operation, transmit a "RETRY" signal on the system bus, and begin propagating the operation to the top of their respective cache hierarchies.

Note that recipients must initially respond RETRY. For the TLBIE/TLBSYNC example, it is possible that there are previously unfinished TLBIE operations present in other processors and the TLBSYNC cannot be allowed to complete in the event unfinished TLBIE operations exist in the processors. The lowest level cache cannot determine whether previous TLBIE operations are present until the processors at the top of each of the cache hierarchies have been polled.

In response to receiving the RETRY signals, the initiator waits a potentially variable period of time before re-initiating the operation. In the current example, also assume that before the initiator re-attempts the operation, the first snooper finishes the execution thereof, and the second snooper fails to complete the execution of the operation. Thus, the scenario for the occurrence of a deadlock is created.

After the operation is re-attempted (second time) by the initiator, the second snooper transmits a "RETRY" signal on the system bus. Since the first snooper has already completed the operation (as first initiated), it accepts the re-attempt as a new operation, thus beginning again the propagation of the operation to the top of its cache hierarchy.

In the current example, further assume that the second snooper has now completed the operation (first attempt), and the initiator now has, once again, re-attempted (third attempt) the operation on the system bus. In this scenario, the second snooper accepts the re-attempt as a new operation, and the first snooper transmits a "RETRY" signal on the system bus.

Further assume that the first snooper has completed the operation (second attempt). Once again, the initiator re-attempts (fourth time) the operation on the system bus, and the above noted process repeats indefinitely. This type of repetition is known in the industry as a "Ping-Pong deadlock".

Note that, in general, a Ping-Pong deadlock scenario can exist when there are more than two recipients as described above. In the most general case, a Ping-Pong deadlock can occur whenever one or more participants have not finished an operation and at least one participant has finished an operation when it is re-presented by the initiator. The snooper or snoopers that have finished the operation can change dynamically between initiations of the operation. This makes a Ping-Pong deadlock more likely to occur in systems with larger numbers of participants.

It would, therefore, be a distinct advantage to have a method and apparatus that would allow execution, using shared buffers, of variable time bus operations while avoiding a Ping-Pong deadlock. The present invention provides such a method and apparatus.

SUMMARY OF THE PRESENT INVENTION

The present invention is a method and apparatus for preventing the occurrence of deadlocks from the execution of variable delay system bus operations. In general, each snooper accepts a given operation at the same time according to an agreed upon condition. In other words, the snooper in a given cache can accept an operation and begin working on it even while retrying the operation. Furthermore, none of the active snoopers release an operation until all the active snoopers are done with the operation. In other words, execution of a given operation is started by the snoopers at the same time and finished by each of the snoopers at the same time. This prevents the ping-pong deadlock by keeping any one cache from finishing the operation before any of the others.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
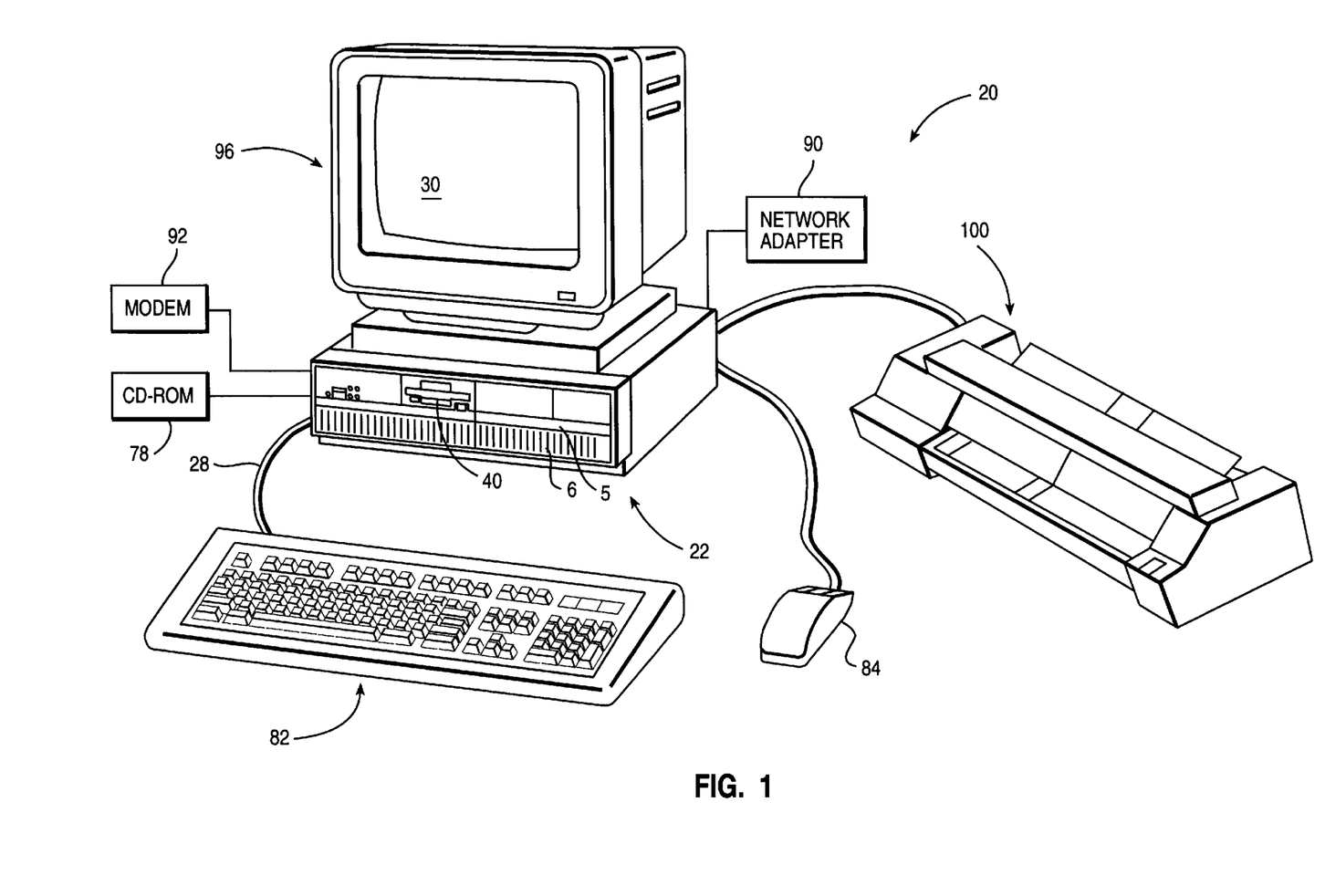
FIG. 1 is a data processing system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system 20 also includes pointing device 84, which may be implemented using a track ball, a joy stick, touch sensitive tablet or screen, track path, or by a mouse as illustrated. The pointing device 84 may be used to move a pointer or cursor on display screen 30. Processor 22 may also be coupled to one or more peripheral devices such as modem 92, CD-ROM compact disc read only memory (CDROM) 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
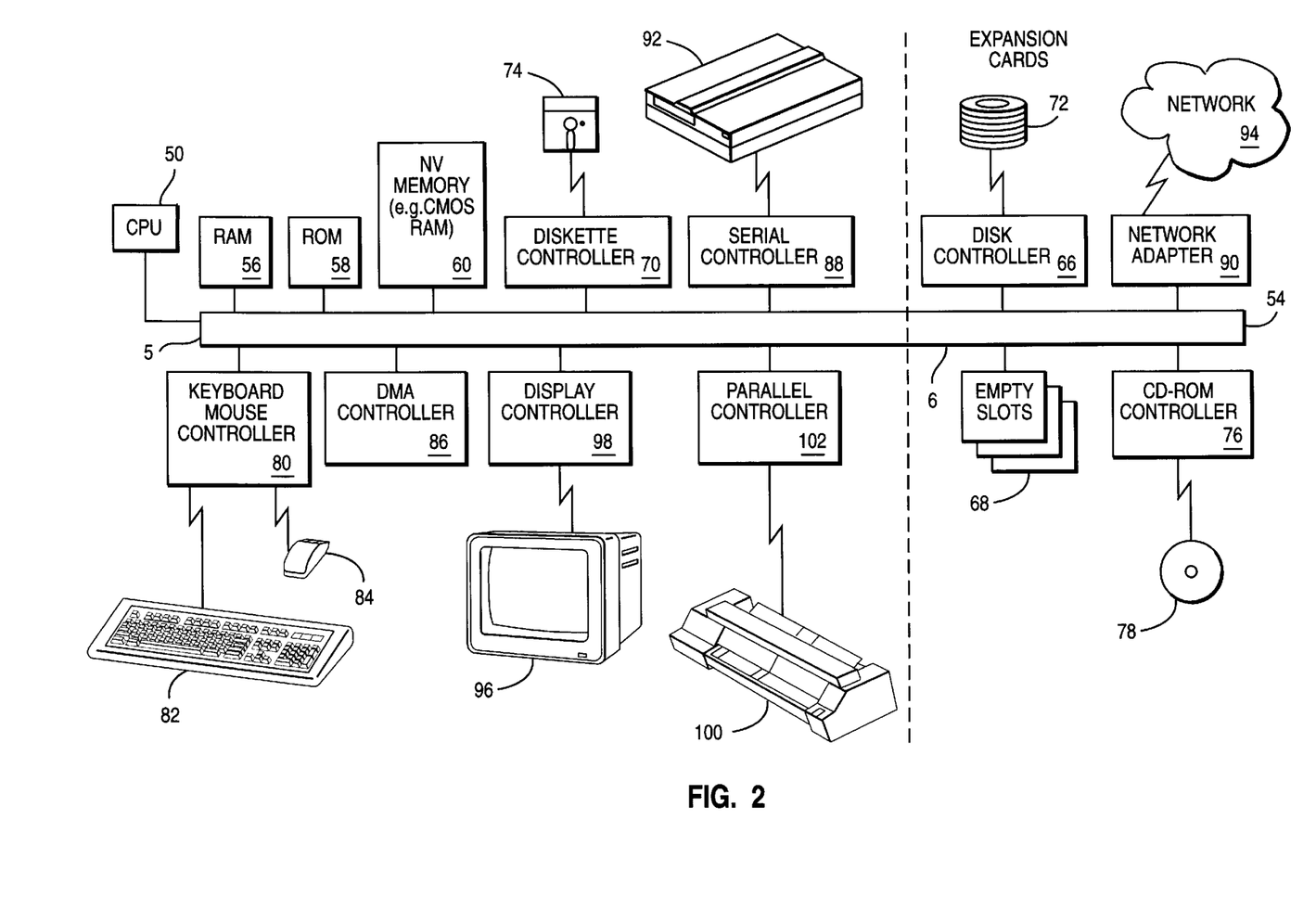
FIG. 2 is a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60, such as complementary metal oxide semiconductor (CMOS) RAM memories include circuitry that allows information to be stored and retrieved. ROMs contain stored data that cannot be modified. Data stored in RAM can be changed by CPU 50 or other hardware devices. Non-volatile memory is memory that does not lose data when power is removed from it. Non-volatile memories include ROM, erasable programmable read only memory (EPROM), flash memory, or battery-backed CMOS RAM. As shown in FIG. 2, such battery-backed CMOS RAM may be used to store configuration information. An expansion card or board is a circuit board that includes chips and other electronic components and that adds functions or resources to the computer. Typically expansion cards add memory, disk controller 66, video support, parallel and serial ports, and internal modems. For lap top, palm top, and other portable computers, expansion cards usually take the form of personal computer (PC) cards, which are credit card-sized devices designed to plug into a slot in the side or back of a computer. An example of such a slot is a PCMCIA (Personal Computer Memory Card International Association) slot which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning a read/write head, mediating between the drive and the CPU 50, and controlling the transfer of information to and from memory. A single disk controller may be able to control more than one disk drive.

CD-ROM controller 76 may be included in data processing system 20 for reading data from CD-ROM 78 (compact disc read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pen, the joystick, the puck, the trackball, the trackpad, and the pointing device sold under the trademark "TrackPoint" by International Business Machines (IBM).

Communication between data processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include the RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears, Roebuck & Co. Such on-line service providers may offer software that may be down loaded into data processing system 20 via modem 92. Modem 92 may provide a connection to other sources of software or information, such as a server, an electronic bulletin board, the Internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with a CRT-based video display, an LCD-based flat panel display, or a gas plasma-based flat-panel display. Display controller 98 includes electronic components required to generate a video signal that is sent to display 96. Printer 100 may be coupled to data processing system 20 via parallel controller 102. Printer 100 is used to put text or a computer-generated image on paper or on another medium, such as transparency. Other types of printers may include an image setter, a plotter, or a film recorder. Parallel controller 102 is used to send multiple data and control bits simultaneously over wires connected between system bus 5 and another parallel communication device, such as printer 100. CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

Variable time bus operations in such computing systems have two essential characteristics. The first of these is whether the operation can be, during a given time interval, initiated by multiple participants. In other words, whether more than one participant can have the given operation outstanding at a given point in time. Hereinafter, this characteristic will be referred to as being singly- or multiply-sourced. If a given operation is only permitted to be issued until completion by one participant at a time, the operation will be referred to as singly-sourced. Likewise, if the operation may be outstanding from more than one participant simultaneously, it will be referred to as multiply-sourced.

Furthermore, operations can be characterized as multiply-initiated or singly-initiated. An operation is singly-initiated if any given participant is only allowed to have one operation of the given type outstanding at a time. Likewise, if a participant is allowed to have multiple operations of the given type outstanding at a time, the operation is referred to as multiply-initiated. Multiply-initiated operations require that an "address" be presented on the bus with the operation to distinguish between the various instances of the operation outstanding at any given moment in time.

Most bus protocols include a number of signals that are referred to collectively as the address of an operation. However, in what follows, address is construed to only mean that portion of the signals in the bus protocol that are necessary to distinguish between different instances of a multiply-initiated operation. These signals can correspond to the address signals for the given bus protocol, some subset of the address signals for the given bus protocol, or either of the aforementioned with such other signals in the bus protocol as are necessary to distinguish between multiply-initiated operations.

It is possible for an operation to be singly-sourced, but multiply-initiated and likewise for an operation to be multiply-sourced, but singly-initiated. One characteristic (multiply-sourced vs. singly-sourced) determines the number of participants allowed to have an operation of a given type outstanding. The other characteristic (multiply-initiated vs. singly-initiated) determines the number of operations of a given type a participant is allowed to have outstanding simultaneously. Typically these characteristics of operations are defined by the "architecture" of the given computer system and the computer system will not function correctly if software violates these restrictions, by, for example, having multiple processors simultaneously issue a singly-sourced operation.

Hereinafter, these two characteristics of operations will be referred to collectively as the "character" of an operation. There are four possible characters of an operation according to the teachings of the present invention: singly-initiated, singly sourced; multiply-initiated, singly sourced; singly-initiated, multiply-sourced; and multiply-initiated, multiply-sourced. The present invention is a system to allow the deadlock free execution of variable delay bus operations of differing character using the shared resources. The copending applications discussed earlier disclose apparatuses and mechanisms to allow the deadlock free execution of operations of a particular character. The present invention expands the teachings of these inventions to disclose a deadlock free method of execution that allows the sharing of buffers between operations of differing characters.

The present invention allows the processing of variable time bus operations of differing character using shared structures. It should be noted that any possible combination of operations of the differing characters described above can be processed concurrently using the shared structures of the present invention. More particularly, it is possible, for example, to process a singly-initiated, singly-sourced operation(s) concurrently with a multiply-initiated, multiply sourced operation(s). Similarly, it is possible to concurrently process an operation(s) from each of the four characters using the shared structures of the present invention.

Figure 3:
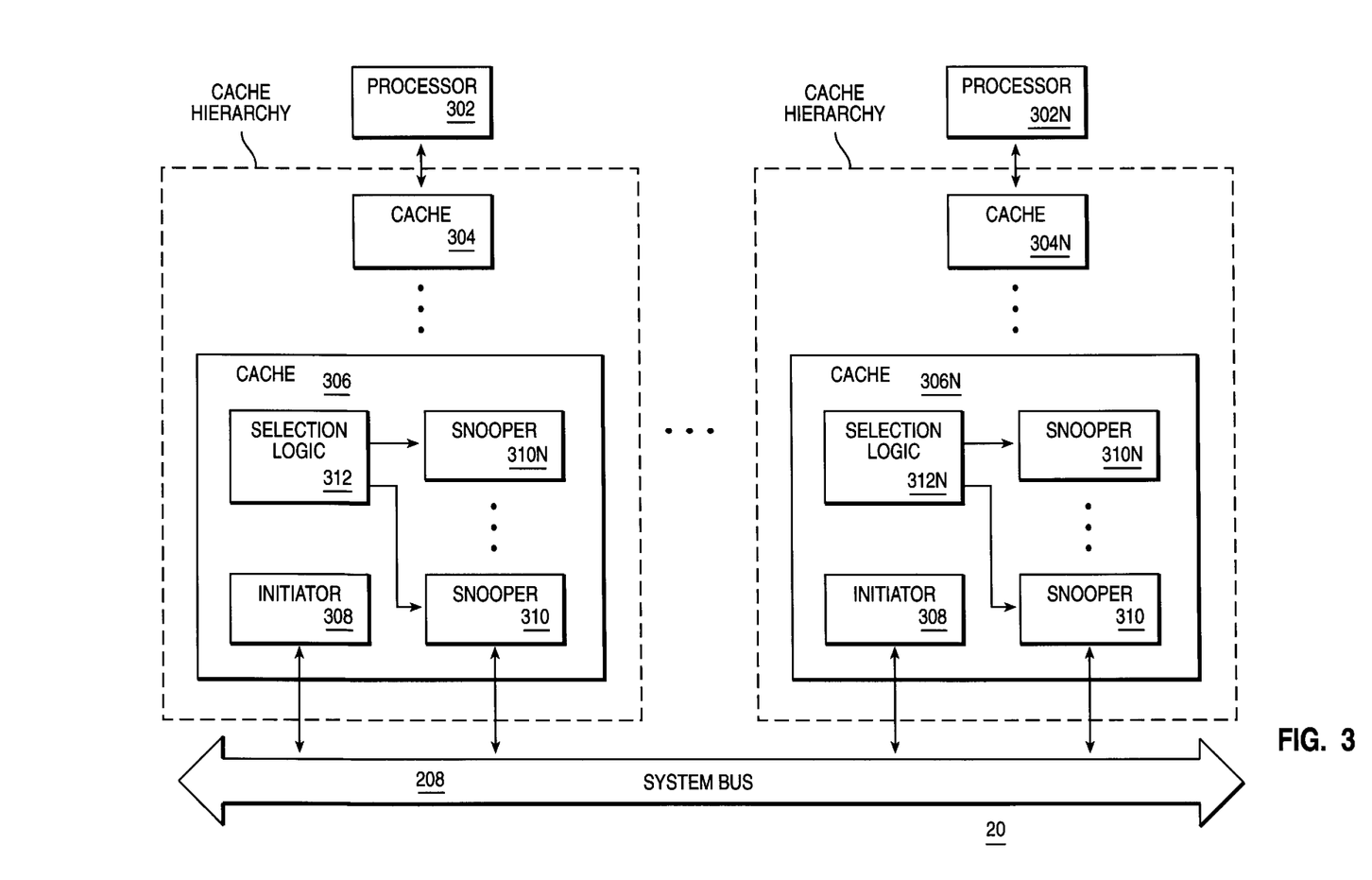
FIG. 3 is a schematic diagram illustrating in greater detail a preferred embodiment of the computer (i.e. data processing system) system of FIG. 1 according to the teachings of the present invention.

Reference now being made to FIG. 3 a schematic diagram is shown illustrating in greater detail a preferred embodiment of the computer system 20 of FIG. 1 according to the teachings of the present invention. As shown, the preferred embodiment is a multi-processor (302 to 302n) environment that includes a cache hierarchy (304 to 306 and 304-n to 306-n). The last cache in the hierarchy (i.e. the one closest to the system bus 208) (306-n) operates in accordance with the protocols of the present invention.

Cache 306 is representative of caches 306 to 306-n, and therefore, the discussion hereinafter with respect to cache 306 is equally applicable to the other caches such as caches 306-n. Cache 306 includes an initiator 308, one or more snoopers 310 to 310-n and selection logic 312. Each cache 306n has the same number of snoopers 310 to 310-n. As used hereinafter, reference numerals 302-n, 304-n, 306-n, 310-n, 312-n, shall be construed as meaning 302 to 302-n, 304 to 304-n, 306 to 306-n, 310 to 310-n and 312 to 312-n, respectively.

The protocol of the preferred embodiment of the present invention is divided into two separate parts: an initiator protocol, and a snooper protocol. The initiator and snooper protocols are independent of one another, and communicate by passing transactions over the system bus 208.

In the preferred embodiment of the present invention, these protocols are implemented via the initiator 308 and snooper 310.

The initiator 308 is responsible for initiating operations on the system bus 208. The initiator, depending on the character of the operations processed by the apparatus of the present invention, processes both singly and multiply initiated operations. In those systems that make use of the present invention to process both singly-initiated and multiply-initiated operations, the initiator 308 will follow an arbitration protocol to sequence the initiation of the various singly-initiated and multiply-initiated operations that are active at a given time.

For operations that are singly-initiated, the initiator 308 will only accept one instance of the given singly-initiated operation at a time. The initiator 308 will then present this operation, subject, if necessary, to servicing differing singly-initiated operations and other multiply-initiated operations, on the system bus 208 until successful completion.

It should be noted that it is possible for two different singly-initiated operations to be presented on the system bus 208 in an interleaved fashion. For any given singly-initiated operation, the initiator 308 will only have one instance in progress at any given point in time. However, no such restrictions are placed on different singly-initiated operations, and it is possible to have differing singly-initiated operations in progress simultaneously.

For multiply-initiated operations, the initiator 308 usually accepts, if available, multiple different instances of a given operation at a time before any given operation is completed. This forms a set of instances of the given operation in progress. Typically, the initiator 308 cycles through operations in this set according to some arbitration policy that interacts with the arbitration policy that cycles through the singly vs. multiply initiated operations processed by the initiator.

These arbitration policies are designed to prevent higher-level system deadlocks and facilitate the performance of the overall computer system. No operation is abandoned, but rather, all operations accepted by the initiator 308 are carried through to completion.

Furthermore, it is possible to use the mechanism of the current invention to process some subset of the varible time operations present in a system using replicated structures while using the mechansims of the prior cited applications.

In the present invention, it is the primary task of the protocol for snooper 310 to prevent ping-pong deadlocks from occuring. This is accomplished by three major aspects of the snoopers 310-n and their associated protocol:

1) for any given operation, a snooper 310 is allocated in every cache 306n to "process" an operation. 2) The afornentioned allocated snoopers begin processing on an operation at the same time and finish processing the operation at the same time. 3) Each cache 306n has the same number of snoopers 310n.

By insuring that each cache allocates a snooper 310-n to snoopers all begin and end processing an operation at the same time. Thus, the asymmetrical condition that leads to the ping-pong deadlock (some snoopers finished with an operation, and therefore, treat a re-presentation on the bus as a new operation) is avoided. Furthermore, each cache 306-n is required to have the same number of snoopers 310-n. If a cache 306-n did not have the same number of snoopers, it would be possible for a cache 306-n to accept an operation, and begin processing it when the snoopers for the other participants are all occupied with previous operations. This asymmetry (one cache 306-n processing an operation that none of the others are concurrently processing) can lead to a ping-pong deadlock and must be avoided.

In order for a snooper 310-n to successfully respond to snooped operations of differing character, it is necessary for a snooper 310-n to maintain enough information to disambiguate operations presented on the system bus 208, and to determine if the operation is currently being processed by a snooper 310-n, or conversely if the operation is a new operation not yet being processed.

In the most general case, there are three qualifing indicators for an operation: operation type, operation address, operation source.

The operation type is a unique identifier that specifies the type of operation. Each variable time bus operation in the data processing system 20 is assigned a unique type identifier that distinuishes amongst the various operations. These type identifiers are irrespective of the character of the operation.

The address of an operation is used to distinguish between multiple instances of a multiply-initiated operation. Note that operations which are singly-initiated do not have a meaningful address for purposes of snoopers 310-n distinguishing operations. It is possible that the bus protocol for a singly-initiated operation has signals that are thought of in the bus protocol as the "address" for the operation. However, the snooper 310-n does not need to, nor does it use this information to distinguish operations. This information may be passed on to the processor 302-n as a part of processing the snooped operation.

Finally, an operation's source is used to distinguish between differing instances of a multiply-sourced operation initiated by multiple participants. Only multiply-sourced operations have valid source information. While it is common to attach a source indication to every operation presented on system bus 208, it is not necessary to do so and furthermore, snoopers 310-n in the present invention typically do not use this information when distinguishing between operations that are not multiply-sourced.

The table below shows the various characters of the operations and the distinuishing information that is valid for each character of operation:

TABLE 1

Valid Distinguishing Information for operation character.

| Singly-Sourced Singly-Initiated | Singly-Sourced Multiply-Initiated | Multiply-Sourced Singly-Initiated | Multiply-Sourced Multiply-Initiated | |
|---|---|---|---|---|
| | | X | X | Operation Source |
| | X | | X | Address |
| X | X | X | X | Type |

For snoopers 310-n of the present invention to succesfully disambiguate operations of differing character that are being processed, it is necessary for snoopers to maintain the necessary distinguishing information for any possible character of operation being presented.

As a concrete example, consider a system, following the teachings of the preset invention, processing one or more singly-initiated, singly-sourced operations concurrently with one or more multiply-initiated, multiply-sourced operations. In such a system, a snooper 310-n would need to maintain type information, address information (for the multiply-initiated operation or operations), and source information (for the multiply-sourced operation or operations).

As an additional example, a system, according to the teachings of the present invention, processing singly-initiated, singly-sourced operations and singly-initiated, multiply sourced operations would need to maintain type information, and source information (for the multiply initiated operation or operations). The snooper 310-n, by maintaining the information shown in Table 1, can accurately disambiguate operations as described hereinafter.

Figure 4:
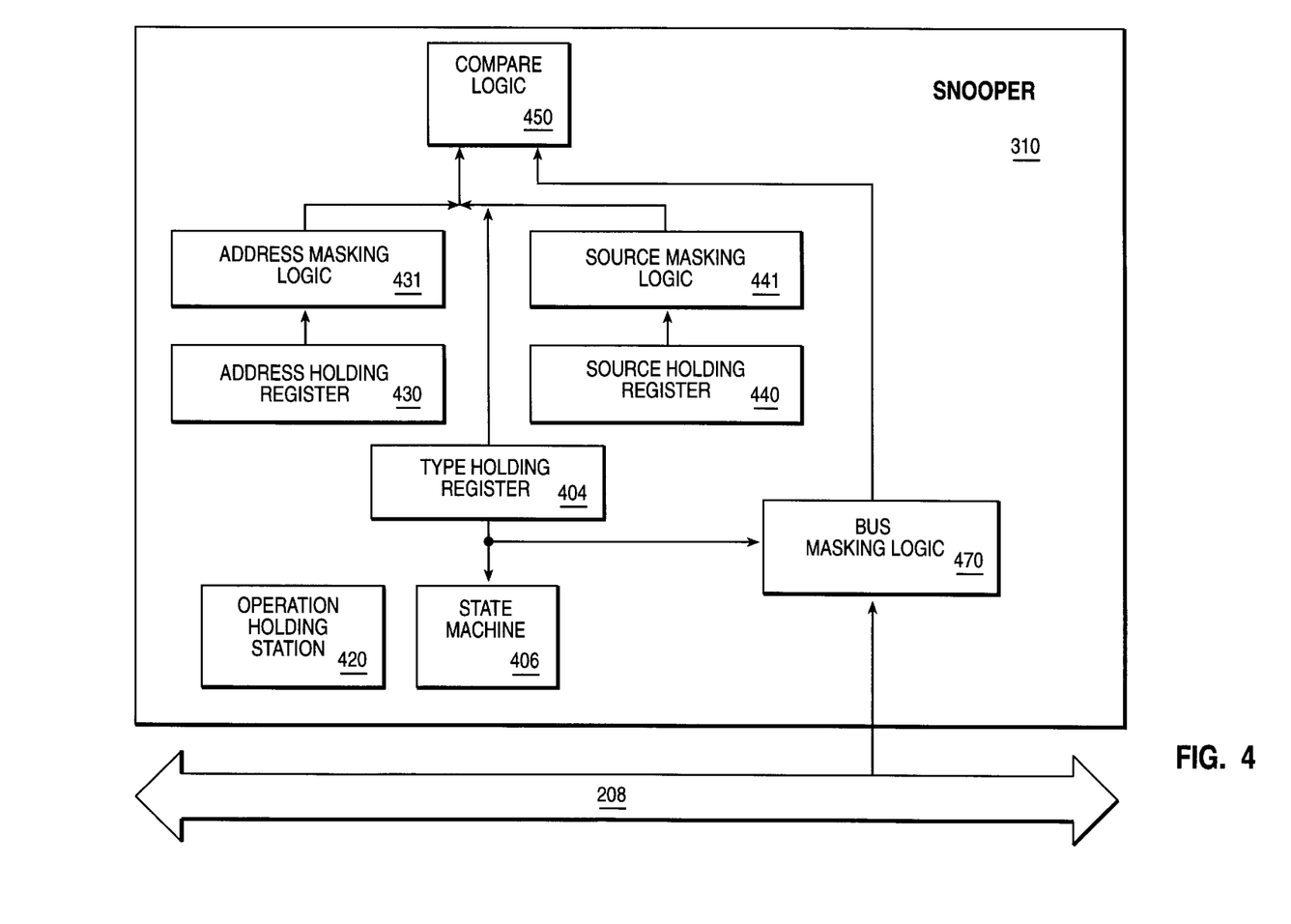
FIG. 4 is a block diagram illustrating in greater detail the snooper of FIG. 3 according to the basic protocol as defined by the teachings of the present invention.

Reference now being made to FIG. 4, a block diagram is shown illustrating in greater detail snooper 310 of FIG. 3 according to the teachings of the present invention. This figure should be seen only as a description of a possible implementation of the function performed by the snooper 310. It will be apparent to those of ordinary skill in the art that other possible implementations are possible. In particular, one possible alternative implementation would be to use the masking logic units 431 and 441 to mask the system bus 208 data before it is placed into the address holding register 430 and source holding registers 440.

As shown, snooper 310 includes a state machine 406, an address holding register 430, address masking logic 431, source holding register 440, source masking logic 441, compare logic 450, bus masking logic 470, a type holding register 404, and an operation holding station 420.

The operation holding station 420 contains the information from the system bus 208 for the operation that must be propagated up the cache hierarchy in order to perform the given operation. Although not shown for clarity purposes, one skilled in the art readily understands that the operation holding station 420 is connected to the system bus 208.

The address holding register 430 contains the address of the operation from the system bus 208. Once again, for reasons of providing clarity the address holding register 430 is not shown as being connected to system bus 208. This address is used to allow the various snoopers 310-n to distinguish between differing instances of multiply-initiated operations processed by the mechanism of the present invention. If the snoopers 310-n of the present invention do not process any multiply-initiated operations, address holding register 430 and address masking logic 431 are not necessary and are typically not implemented.

The type holding register 404 holds an indication from the system bus 208 for the operation being processed. Each operation processed by the mechansim of the present invention has such an indication that is presented concurrently with the operation on the system bus 208 and is furthermore unique to each operation processed by the present invention regardless of the character of the operation.

State machine 406 implements the snooper protocol which is described in greater detail in connection with FIG. 5 hereinafter.

The source holding register 440 contains an indication from the system bus 208 that denotes which cache 306-n initiated the operation. Once again, the source holding register 440 is connected to the system bus 208 though this is not shown in FIG. 4 for clarity purposes.

Many existing bus protocols have signals dedicated to "tagging" operations and it is often possible to re-use these signals to indicate the participant sourcing an operation onto the bus. If such signals are unavailable or unusable, it is a trivial matter to add a number of additional side-band signals to an existing protocol as an indication of the source of an operation. If the snoopers 310-n of the present invention do not process any multiply-sourced operations, then source holding register 440 and address masking logic 441 are not necessary, and are typically not implemented.

It should be noted, however, that the operation holding station 420, source holding register 440, and address holding register 430, if present, are only valid if the state machine 406 is not in the IDLE state.

The snooper 310 of uses the various masking logic units (431, 441, and 470) along with compare logic 450 to successfully disambiguate between operations of different character when determining if an operation snooped from system bus 208 corresponds to the particular operation being processed by the snooper 310. To disambiguate between operations of differing character, it is necessary for the snooper 310 to potentially ignore some, any, or all of the information stored in the snooper 310 and from the system bus 208 when such information is not relevant to the character of the particular operation being processed by the snooper 310.

For example, the address of a singly-initiated operation is undefined for purposes of disambiguating snooped operations. It is therefore possible that the signals used to signify the address of an operation on the system bus 208 may vary randomly between differing repeated presentations by the initiator 308 of a given singly-initiated operation. In such a case, it is necessary for the snooper 310-n to succesfully determine that the repeated presentations of the singly-initiated operation are in fact the same operation even if the signals on the system bus corresponding to the address change between re-presentations.

To achieve this disambiguation, the snooper 310 uses the masking logic units 431 and 441, if present, to mask off those portions of the address register 430 and source register 440 that are not relevant to the operation being processed by snooper 310. Furthermore, masking logic unit 470 is used to mask the address and source signals on the system bus 208, as necessary, for the type of operation being processed by the snooper 310.

All masking logic units (431, 441, 470) are driven by the type holding register 404 to ensure that the same fields are masked for the both the registers 430 and 440.

Further, compare logic unit 450 performs a comparison between the type information from the system bus 208 and type holding register 404, along with the, possibly masked, address and source information from the snooper registers and the system bus to determine if the operation snooped on the system bus corresponds to the operation being processed by the snooper 310. The compare logic unit 450 produces as output an indication of a match that is used by the selection logic unit 312 and snooper state machine 406 as described hereinafter to facilitate the snooper protocol.

Figure 5:
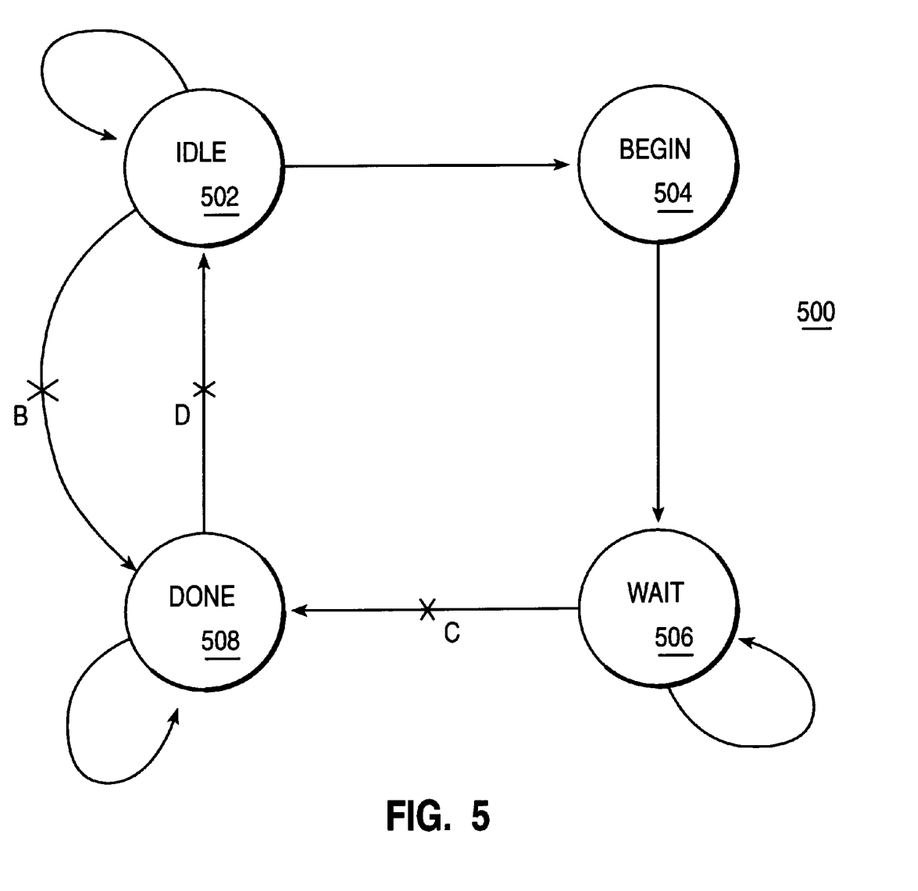
FIG. 5 is a state diagram illustrating the implementation of the state machine of FIG. 4 for executing the basic snooper protocol according to the teachings of the present invention.

Reference now being made to FIG. 5, a state diagram 500 is shown illustrating the implementation of state machine 406 of FIG. 4 for executing the snooper protocol according to the teachings of the present invention.

The snooper state machine 406 can proceed according to two distinct paths depending on whether the operation snooped is initiated from the same cache that the snooper is present in or is initiated from a different cache. As shown in FIG. 5, state machine 406 moves through the following three phases in the protocol when the operation is from a differing cache:

1) waiting for an operation (idle (502));
2) propagating an operation up the hierarchy (begin (504) and wait (506)); and
3) finished propagating the operation, waiting for the operation to be repeated on the system bus (208) so that completion thereof is accomplished (done (508)).

However, when the snooped operation is initiated from the same cache as the snooper, the state machine 406 instead proceeds through a subset of these phases:

1) waiting for an operation (idle (502));
2) finished, waiting for the operation to be repeated on the system bus (208) so that completion thereof is accomplished (done (508)).

The differences between these two cases with be described in greater detail hereinafter. In what follows, a snooper state machine (406) will be referred to as active if the state machine (406) is not in the IDLE state (502). Also, a snooper state machine (406) will be referred to as processing an operation if the state machine is in the BEGIN (504) or WAIT (506) states. In order to further clarify the various aspects of the preferred embodiment of the present invention, state machine 406 is explained hereinafter in connection with caches 306-n.

When an operation to be processed by the mechanism of the present invention is snooped on the system bus 208, two distinct cases occur. In the first case, the snooped operation's source indication matches that of the cache 306-n snooping the operation, and therefore, the operation was initiated onto the system bus by the same cache 306-n. This is referred to as a "local" operation.

In the second case, the snooped operation's source indication does not match that of the current cache 306-n, and therefore, the operation was initiated onto the system bus by a different cache 306-n. This is referred to as a "foreign" operation.

It should be noted that while the snoopers 310 do not use the source information to disambiguate between operations that are not multiply sourced, this information can be used to distinguish between foreign and local operations. This requires that source information be correct even for non-multiply-initiated operations. Alternatively, a direct indication can be sent from the initiator 308 to the snoopers 310-n and selection logic 312 to indicate when an operation is sourced from the local cache 306-n. These differing cases (foreign vs. local) are handled differently by the snooper state machine 406.

Initially, all snoopers 310-n begin in the IDLE state (502). When an operation, handled by the present invention, is placed on the system bus 208, this is detected by selection logic 312. If the selection logic 312 determines that no snooper 310-n is currently active due to the operation and that one or more snoopers 310-n are idle, the selection logic 312 will select a snooper 310-n to activate to begin processing the operation. It is not necessary that the selection logic units 312-n in each cache 306-n select the same snooper 310-n. It is only necessary that the selection logic units 312-n choose some snooper 310-n in each cache 306-n that is idle.

The selection logic 312 determines if any snooper 310-n is currently active for the given operation by examining indications from the snoopers 310-n denoting whether the snooped operation matches the one that activated the snooper 310-n.

If the operation is a "local" operation, the selected snooper's 310-n state machine 406 transitions directly from the IDLE state (502) to the DONE state (508) by means of arc B. Therefore, the initiating snooper's 310-n state machine 406 will wait for the operation to be completed by the non-initiating caches 306-n in the system.

However, if the operation is a "foreign" operation, the selected snooper's 310-n state machine 406 transitions from the IDLE state (502) to the BEGIN state (504).

It should be noted that when a state machine 406 is first activated by moving out of the IDLE (502) state, the bus operation is retried by that snooper 310-n. The operation cannot be allowed to complete on the system bus (208) (no retry) until the operation has been presented to and completed on the processors (302-n) in the system. Therefore, the snooper (310-n) must retry an operation when first activated to process it.

In addition, when a state machine 406 is first activated, the address holding register 430, source holding register 440, and the operation holding station 420 in the corresponding snooper 310 are loaded from the system bus 208.

In the BEGIN (504) state, the snooper 310 takes whatever actions are necessary to start propagating the operation up the cache hierarchy. From the BEGIN (504) state, the snooper (310) unconditionally moves to the WAIT (506) state, where it waits for the operation to completely propagate to the top of the cache hierarchy and succeed. When the operation has succeeded on the local processor 302-n, snooper 310 moves through state machine arc C to the DONE (508) state.

If, while processing an operation, the snooper 310 detects (snoops) a re-presentation of the operation on the system bus 208, the snooper 310 will drive a retry indication to the system bus 208. Unrelated operations of the bus protocol not handled by the mechanism of the present invention are ignored by the snooper (310).

If it is determined that a snooper 310 is currently processing the snooped operation, then the snooped operation is re-tried by the snooper 310, and the state machine 406 does not change state due to the snooped operation.

On the system bus 208, retry is the logical OR of all the individual retry indications of all participant snoopers 310-n and a retry indication, described later, from the selection logic 312.

Likewise, a similar set of conditions is used by the snoopers 310-n to provide indicators to the selection logic 312 denoting when a snooper 310-n is active due to a currently snooped bus operation. The difference is that a snooper 310-n will indicate that it is active due to a snooped bus operation when in any of the BEGIN (504), WAIT (506), or DONE (508) states, and compare logic 450 indicates a match as described hereinbefore. This allows the selection logic 312 to determine when a snooped bus operation already has an activated snooper 310-n. When the selection logic 312 determines that a snooped bus operation has an activated snooper 310-n, then the selection logic 312 takes no further action on the snooped bus operation.

However, the selection logic 312 can retry operations directly. If selection logic 312 detects an operation that should be processed by the present invention being presented on the bus, no snoopers 310-n are currently active for this operation, and all snoopers 310-n are currently active, then the selection logic 312 will retry the operation presented on the system bus 208 directly. This set of conditions corresponds to the situation where a new operation is being presented on the system bus 208 for processing, but all of the snoopers 310-n in the system are busy. In such a case, the operation must be retried until a snooper 310-n becomes available to process the operation.

Furthermore, it may be necessary for selection logic 312 to directly retry operations even if snoopers 310-n are available. When the mechanism of the present invention is used to process differing operations, it may be necessary, in order to avoid a higher level system deadlock or performance degradation, to prevent a given type of operation from occupying all or some substantial portion of the snoopers 310-n at a given point in time.

For example, a system may have two distinct operations A and B. Further assume that these operations have one or more dependencies that prevent, under certain circumstances, one or more instances of the operation from being able to complete unless one or more instances of the other operation are allowed to execute. In such a circumstance, it is possible, if one of the operations were allowed to monopolize all or some substantial portion of the snoopers 310-n in the system, it would be possible to produce a higher level system deadlock between these operations (note that the present invention is directed to preventing a certain form of deadlock in the execution of a given instruction.

It should be noted that the these higher-level system deadlocks can involve more than one instruction, and the previous example serves only as an illustration of a particular circumstance and should not be seen in a limiting sense. The selection logic 312 is responsible for detecting and avoiding these higher-level system deadlocks which are unique to the particular computer system's architecture. Such higher-level dependencies are well known in the art and must be successfully circumvented in any succesful multiprocessor design.

Once a snooper 310 state machine (406) reaches the DONE (508) state, the operation has been successfully completed on the local processor (302-n) and the snooper 310 stops retrying the operation when it is re-presented on the system bus 208. Note that the initiating cache's 306-n snooper 310-n proceeds directly to the DONE (508) state, and does not retry subsequent re-presentations of the operation. Since the activated snoopers 310-n processing an operation in the different caches 306-n proceed to the DONE (508) state, eventually no activated snooper 310-n will RETRY the operation when re-presented by the initiator (308-n).

Once all activated snoopers 310 cease retry's, the next presentation of the operation on the system bus 208 will not be retried and the operation is complete. When the activated snoopers 310-n detect that the operation has completed, by observing the operation on the system bus (208) without retry, all activated snoopers 310-n concurrently move through arc D from the DONE (508) state to IDLE (502) state. This completes the operation and the activated snoopers 310-n are available to process the next assigned operation.

This protocol avoids deadlock by having a snooper 310-n in every cache 306-n accept the operation at the same time according to an agreed upon condition. In other words, the snooper 310 in a given cache can accept an operation and begin working on it even while retrying the operation, since the snooper 310 can infer that all other caches 306-n in the system will also, by convention, be accepting the operation and beginning to process it as well.

It should be noted, however, that this condition only holds as long as all caches 306-n have the same number of snoopers 310-n. If this were not the case, a cache with more snoopers 310-n than some other caches in the system could accept and begin processing an additional operation even if the cache with less snoopers had all of its' snoopers active. In this case, the operation would begin processing and could potentially finish on some caches (the ones with a larger number of snoopers 310-n) before beginning processing on the other caches (the ones with a smaller number of snoopers 310-n). This can lead to a ping-pong deadlock. To avoid such difficulties, the present invention requires that each cache 306-n contain the same number of snoopers 310-n.

In addition, to avoid Ping-Pong deadlock, none of the activated snoopers 310-n release an operation (proceeds from DONE (508) state to IDLE (502) state) until all of the activated snoopers 310-n are finished with the operation.

Execution of a given operation is started by a set of activated snoopers 310-n at the same time and finished by these same snoopers 310-n at the same time. This prevents the Ping-Pong deadlock by keeping no cache 306-n from beginning or finishing the operation before any of the others.

It is assumed in the description above that the effects of the operation are completed on the local processor 302-n before the operation is presented to the initiator 308. As such, the operation does not need to be propagated from the system bus 208 to the initiating processor 302-n. Therefore, the initiating processor's 302-n snooper 310-n proceeds directly to the DONE state via arc B.

It is possible, however, to have a system in which the operation is not completed on the local processor 302-n before being presented to the initiator 308. In such a system, the state machine 406 must be altered to propagate the operation back to the initiating processor 302-n. To perform this alteration, arc B is removed from the state machine depicted in FIG. 5 and all state machines 406 move from the IDLE to BEGIN states. This will cause the snooper 310-n in the initiating cache 306-n to propagate the operation to the processor 302-n at the top of the local cache hierarchy. Furthermore, it is possible that certain variable time bus operations within a system are self-snooping and certain others are not. In such a system, the type information for the operation is then used in state machine 406 to determine the approriate course of action, on a per-operation basis, upon a snooper's 310-n activation. These changes in the protocol are minor and will be apparent to those skilled in the art.

The appropriate implementation choice depends on the whether the operation is completed on the local processor 302-n before being presented to the initiator 308, or if a snooper 310-n is expected to present the operation to the local processor 302-n. Having a snooper 310-n present the operation to the local processor 302-n is referred to as "self-snooping" and is a technique well known to those skilled in the art.

It is thus believed that the operation and construction of the present invention will be apparent from the foregoing description. While the method and system shown and described has been characterized as being preferred, it will be readily apparent that various changes and/or modifications could be made therein without departing from the spirit and scope of the present invention as defined in the following claims.

What is claimed is:

1. In a multiprocessor system having at least one cache for each one of the processors connected to a system bus, a method of processing multiple variable delay system bus operations of differing character while avoiding deadlock, the method comprising the steps of:

detecting the presence of bus operations on the system bus which are singly sourced and singly initiated, or singly sourced and multiply initiated, or multiply sourced and singly initiated, or multiply sourced and multiply initiated;

indicating, in each one of the caches, the source that initiated the detected operation, the type of the detected operation and the instance of a multiply initiated operation; and accepting a detected operation in each one the caches at the same time; and indicating the completion of an operation only after each of the caches have completed the same operation.

2. The method of claim 1 wherein each one of the caches have the same number of processing means for processing a detected operation.

3. The method of claim 2 wherein the step of accepting includes the steps of:

determining whether a processing means is available in one of the caches to process the detected operation; and assigning an available processing means to process the detected operation in each of the caches.

4. The method of claim 3 wherein the step of indicating the completion includes the steps of:

detecting whether any of the other caches have asserted a retry on the system bus for a processed operation; and indicating the completion of the processed operation only after no retries for the processed operation have been detected from the other caches.

5. In a multiprocessor system having at least one cache for each one of the processors connected to a system bus, an apparatus for processing multiple variable delay system bus operations of differing character while avoiding deadlock, the apparatus comprising:

selection logic within each of said at least one caches that detects the presence of bus operations on the system bus which are singly sourced and singly initiated, or singly sourced and multiply initiated, or multiply sourced and singly initiated, or multiply sourced and multiply initiated; and at least one snooping circuit, including:

a source holding register for indicating the source that initiated a detected operation;

a type holding register for indicating a type of the detected operation;

an address holding register for distinguishing between the instances of multiply initiated ones of said detected operations;

an operation holding station that accepts detected operations; and state machine circuitry that causes an operation to be accepted for processing by said snooping circuit in each one of the caches at the same time, and releases an operation only after each of the caches has completed the same operation.

6. The apparatus of claim 5 wherein each one of the caches have the same number of said snooping circuits for processing a detected operation.

7. The apparatus of claim 6 wherein said selection logic determines whether one of said at least one snooping circuits is available in one of the caches to process the detected operation and assigns an available available one of said snooping circuits to process the detected operation in each of the caches.

8. The apparatus of claim 7 wherein said state machine circuitry detects whether any of the other caches have asserted a retry on the system bus for a processed operation and indicates the completion of the processed operation only after no retries for the processed operation have been detected from the other caches.

* * * * *